(12) United States Patent
Cui et al.

(10) Patent No.: US 10,101,979 B2
(45) Date of Patent: Oct. 16, 2018

(54) MANAGING ALIASING CONSTRAINTS

(75) Inventors: Shimin Cui, Toronto (CA); Raul E. Silvera, Woodbridge (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 586 days.

(21) Appl. No.: 13/545,649

(22) Filed: Jul. 10, 2012

(65) Prior Publication Data
US 2013/0019232 A1    Jan. 17, 2013

(30) Foreign Application Priority Data
Jul. 12, 2011    (CA) ...................................... 2746136

(51) Int. Cl.
G06F 9/45 (2006.01)
G06F 8/41 (2018.01)

(52) U.S. Cl.
CPC .................................... G06F 8/443 (2013.01)

(58) Field of Classification Search
CPC ........................................................ G06F 8/443
USPC ......................................................... 717/151
See application file for complete search history.

(56) References Cited

U.S. PATENT DOCUMENTS

| | | | | |
|---|---|---|---|---|
| 5,548,761 A * | 8/1996 | Balasundaram | ........ | G06F 8/443 717/159 |
| 5,808,601 A * | 9/1998 | Leah | ................... | G06F 3/04812 715/856 |
| 5,845,331 A * | 12/1998 | Carter | ................. | G06F 12/0292 711/163 |
| 6,381,738 B1 * | 4/2002 | Choi | ....................... | G06F 8/443 717/162 |
| 6,810,519 B1 * | 10/2004 | Hicks | ....................... | G06F 8/71 717/166 |
| 7,107,430 B2 | 9/2006 | Grossman et al. | | |
| 7,496,894 B2 | 2/2009 | Das | | |
| 7,698,226 B2 * | 4/2010 | Torii | ....................... | G06F 21/10 717/169 |
| 7,818,729 B1 * | 10/2010 | Plum | .................... | G06F 11/3624 717/150 |
| 8,181,168 B1 * | 5/2012 | Lee | ........................ | G06F 8/445 717/149 |

(Continued)

OTHER PUBLICATIONS

Burke et al. "Interprocedural Pointer Alias Analysis", Dec. 15, 1997, IBM.*
Hind et al., "Interprocedural Pointer Alias Analysis", Jul. 1999, ACM, vol. 21, No. 4, pp. 848-894.*
Chase et al., "Analysis of Pointers and Structures", Jun. 1990, ACM.*

(Continued)

*Primary Examiner* — Wei Zhen
*Assistant Examiner* — Junchun Wu
(74) *Attorney, Agent, or Firm* — Cuenot, Forsythe & Kim, LLC

(57) ABSTRACT

An illustrative embodiment of a computer-implemented process for managing aliasing constraints, identifies an object to form an identified object, identifies a scope of the identified object to form an identified scope, and assigns a unique value to the identified object within the identified scope. The computer-implemented process further demarcates an entrance to the identified scope, demarcates an exit to the identified scope, optimizes the identified object using a property of the identified scope and associated aliasing information, tracks the identified object state to form tracked state information; and uses the tracked state information to update the identified object.

20 Claims, 7 Drawing Sheets

(56) References Cited

U.S. PATENT DOCUMENTS

| | | | |
|---|---|---|---|
| 2003/0074655 A1* | 4/2003 | Robison | G06F 8/434 717/162 |
| 2005/0086666 A1* | 4/2005 | Nason | G06F 21/82 719/321 |
| 2006/0080639 A1* | 4/2006 | Bustelo | G06F 8/20 717/111 |
| 2006/0130021 A1* | 6/2006 | Plum | G06F 11/3624 717/140 |
| 2008/0229286 A1 | 9/2008 | Kahlon | |
| 2009/0235237 A1* | 9/2009 | Song | G06F 8/456 717/132 |
| 2009/0235240 A1* | 9/2009 | Stoodley et al. | 717/148 |
| 2010/0162219 A1* | 6/2010 | Bowler | G06F 8/434 717/154 |
| 2010/0235817 A1 | 9/2010 | Kahlon et al. | |
| 2012/0030660 A1* | 2/2012 | McGrath | G06F 8/443 717/152 |
| 2012/0198428 A1* | 8/2012 | Schmidt | G06F 8/443 717/153 |

OTHER PUBLICATIONS

Han et al, "hiCUDA: High-Level GPGPU Programming", Jan. 2011, IEEE, vol. 22, No. 1.*

Wu et al., "Performance Potentials of Compiler-directed Data Speculation", 2003, IEEE.*

Koes, D. et al., "Programmer Specified Pointer Independence," MSP '04, Proc. of 2004 Workshop on Memory System Performance, 14 pgs., Apr. 14, 2003.

Kahlon, V. "Bootstrapping: A Technique for Scalable Flow and Context-Sensitive Pointer Alias Analysis," ACM SIGPLAN Notices 43, No. 6 (2008), 10 pgs.

CA Appln. No. 2746136, Office Action, dated Dec. 28, 2016, 6 pg.

* cited by examiner

```
void* __restricted_copyin(void* original) {
    void* copy = malloc(sizeOfOriginal);
    memcpy(copy, original, sizeOfOriginal);
    return copy;
}
```
402

404

```
void* __restricted_copyin(void* original) {
    return original;
}
```
406

408

```
void __restricted_copyout(void* copy, void* original) {
    memcpy(original, copy, sizeOfOriginal);
    free(copy);
}
```
410
412

414

```
void __restricted_copyout(void* copy, void* original) {
}
```
416

FIG. 7

```
            700
  704        {       /* block scope n */       702
              ─     int * restrict q = p;  ─ goto out_of_scope_n;
  706               ... // *q=*q+...;
              }
                   ...
                   out_of_scope_n:
```

FIG. 8

```
  800
                                   804    806
                                802 int *q = __restricted_copy(copyin, uid, (p, defuse));
             ...
  808        __restricted_copy(copyout, uid, (q, defuse), (p, defuse));
             goto out_of_scope_n;
             ... // *q=*q+...;
  810        __restricted_copy(copyout, uid, (q, defuse), (p, defuse));
             ...
             out_of_scope_n:
```

MANAGING ALIASING CONSTRAINTS

CROSS-REFERENCE TO RELATED APPLICATIONS

This application is a claims benefit of Canadian Patent Application Number 2746136, filed on Jul. 12, 2011, and entitled "Managing Aliasing Constraints", which is fully incorporated herein by reference.

BACKGROUND

Technical Field:

This disclosure relates generally to optimizing compilation in a data processing system and more specifically to managing aliasing constraints in optimizing compilations in the data processing system.

Description of the Related Art:

Existing programming languages have provided some form of scope restricted pointers to a programmer, for example, block scope restricted pointers in C programming language and dummy arguments in FORTRAN programming language. In C, a block-scope restricted pointer makes an aliasing assertion limited to the scope of the pointer. In the scope of the restricted pointer, a target object of the pointer will not be accessed through any pointer that was not copied from the pointer and two such restricted pointers cannot be used to access the same object while the pointers are both within the scope. It is often critical for compilers to exploit these scope restricted aliasing rules to achieve runtime performance.

Current compilers often perform analysis for only those restricted pointers that are parameters or function scope variables and thus forego improved aliasing for block scope restricted pointers, because the analysis of scope restricted aliasing is difficult to represent. Traditional support for function-scope restricted pointers also introduces several issues. A separate shadow (an artificial symbol to represent the effect of dereferencing a pointer) is created for each restricted parameter and a flag is set on the shadow to indicate aliasing of the shadow can be refined to anti-alias to all other parameter shadows on the same function. Shadowing may create an explosion in the number of symbols with different aliasing that must be represented. Also, this shadowing may create problems for optimizations that move code across function call boundaries (for example, after in-lining or inter-procedural code motion, the restricted parameters are block scoped in the called function) because the refined aliasing for the specific shadow may not be sufficient outside of their associated scope. The problem arises because in a compiler the alias relationship for two symbols, whether alias or do not alias each other, is true for all accesses to these symbols throughout the whole program. For scope restricted pointers, although a certain level of scope restricted aliasing can be achieved by using different shadows to access the same storage on different parts of the program, there is typically no explicit mechanism, to prevent accesses to those shadows from migrating outside of their corresponding section of control. Therefore, there is a need to enable compilers to apply more aggressive aliasing for restricted pointers on specific regions of code for better runtime performance.

SUMMARY

According to one embodiment, a computer-implemented process for managing aliasing constraints, identifies an object to form an identified object, identifies a scope of the identified object to form an identified scope, and assigns a unique value to the identified object within the identified scope. The computer-implemented process further demarcates an entrance to the identified scope, demarcates an exit to the identified scope, optimizes the identified object using a property of the identified scope and associated aliasing information, tracks the identified object state to form tracked state information; and uses the tracked state information to update the identified object.

According to another embodiment, a computer program product for managing aliasing constraints comprises a computer recordable-type media containing computer executable program code stored thereon. The computer executable program code comprises computer executable program code for identifying an object to form an identified object, computer executable program code for identifying a scope of the identified object to form an identified scope, computer executable program code for assigning a unique value to the identified object within the identified scope, computer executable program code for demarcating an entrance to the identified scope, computer executable program code for demarcating an exit to the identified scope, computer executable program code for optimizing the identified object using a property of the identified scope and associated aliasing information, computer executable program code for tracking the identified object state to form tracked state information and computer executable program code for using the tracked state information to update the identified object.

According to another embodiment, an apparatus for managing aliasing constraints comprises a communications fabric, a memory connected to the communications fabric, wherein the memory contains computer executable program code, a communications unit connected to the communications fabric, an input/output unit connected to the communications fabric, a display connected to the communications fabric and a processor unit connected to the communications fabric. The processor unit executes the computer executable program code to direct the apparatus to identify an object to form an identified object, identify a scope of the identified object to form an identified scope, and assign a unique value to the identified object within the identified scope. The processor unit further executes the computer executable program code to direct the apparatus to demarcate an entrance to the identified scope, demarcate an exit to the identified scope, optimize the identified object using a property of the identified scope and associated aliasing information, track the identified object state to form tracked state information and use the tracked state information to update the identified object.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

FIG. 4 is a textual representation of code snippets, in accordance with one embodiment of the disclosure;

FIG. 7 is a code snippet of a C language program comprising restricted pointers, in accordance with one embodiment of the disclosure; and FIG. 8 is a code snippet of a C language program comprising restricted pointers, in accordance with one embodiment of the disclosure.

DETAILED DESCRIPTION

Figure 1:
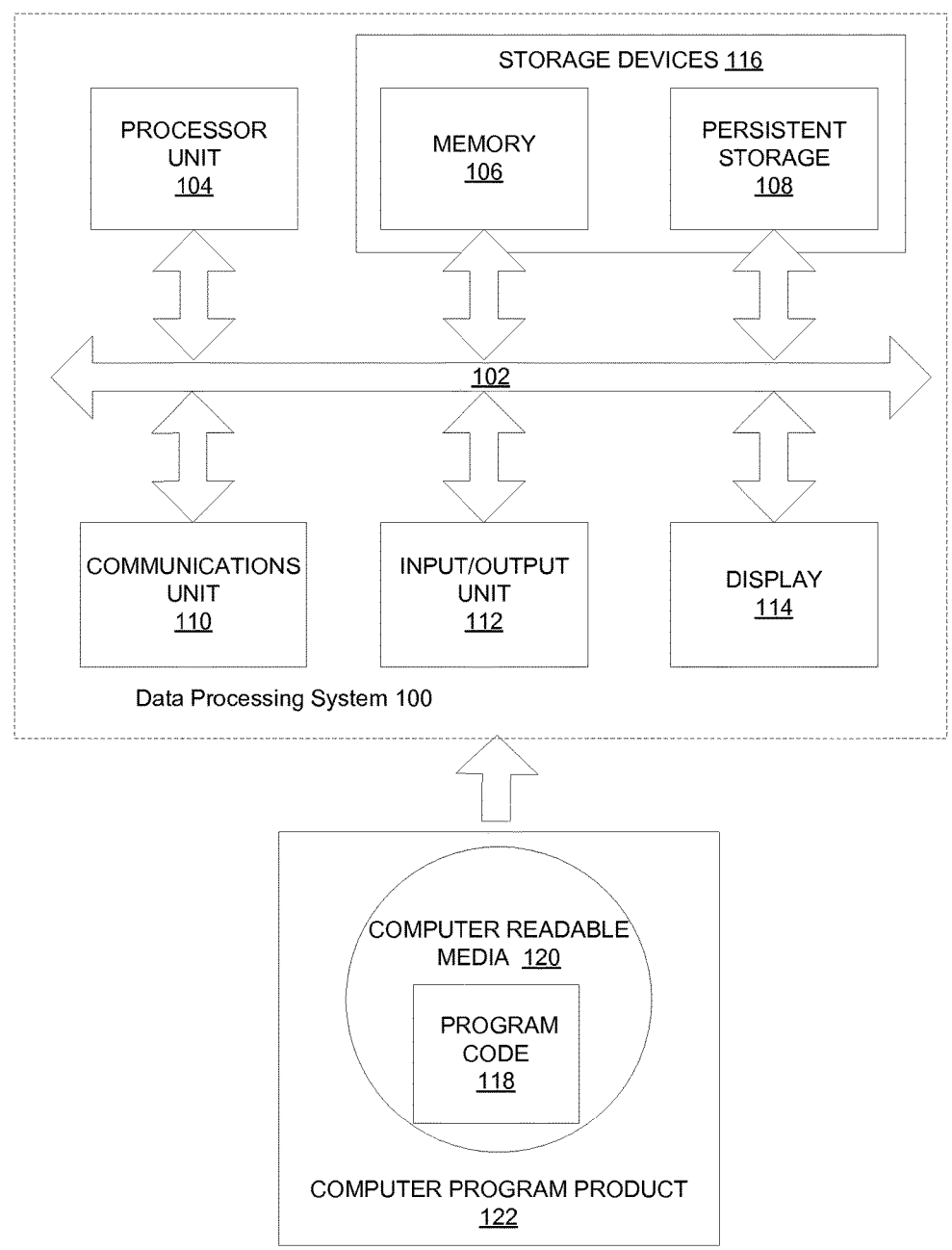
FIG. 1 is a block diagram of an exemplary data processing system operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java™, Smalltalk, C++, or the like and conventional procedural programming languages, such as the "C" programming language or similar programming languages. Java and all Java-based trademarks and logos are trademarks of Oracle, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Turning now to FIG. 1 a block diagram of an exemplary data processing system operable for various embodiments of the disclosure is presented. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instructions are in a functional form on persistent storage 108. These instructions may be loaded into memory 106 for execution by processor unit 104. The processes of the different embodiments may be performed by processor unit 104 using computer-implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 may be any hardware apparatus that may store data. Memory 106, persistent storage 108 and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

According to an illustrative embodiment, a computer-implemented process for managing aliasing constraints, identifies an object to form an identified object, identifies a scope of the identified object to form an identified scope, and assigns a unique value to the identified object within the identified scope. The computer-implemented process further demarcates an entrance to the identified scope, demarcates an exit to the identified scope, optimizes the identified object using a property of the identified scope and associated aliasing information, tracks the identified object state to form tracked state information; and uses the tracked state information to update the identified object.

Illustrative embodiments of the disclosure represent a technique for managing aliasing constraints represented by an optimizing compiler to enable typically widespread optimizations, which are likely to improve compilation and application performance. The illustrative embodiments are not only used to support a restricted pointer of the examples, but also can be applied in other cases. For example, correcting the anti-alias violations based on the violation levels using a copyin operation, which kills two given shadows, as an optimization barrier for these sorts of applications. In another example, the address taken refinement using control flow is currently limited to scalar variables. The copyin mechanism can be used in general to separate the address taken portion and the non-address taken portion.

Using the disclosed technique of the illustrative embodiments, a front end portion of a compilation system can generate refined aliasing to a back end portion, typically reducing compile time, but also resolving a long outstanding functional problem of module member aliasing with parameters.

Additionally, the copyin/copyout mechanism, proposed for restricted aliasing in the examples of this disclosure can be logical or real depending on an implementation.

Using data processing system 100 of FIG. 1 as an example, an illustrative embodiment provides the computer-implemented process stored in memory 106, executed by processor unit 104, for managing aliasing constraints. Processor unit 104, identifies an object to form an identified object, identifies a scope of the identified object to form an identified scope, and assigns a unique value to the identified object within the identified scope. Processor unit 104 further demarcates an entrance to the identified scope, demarcates an exit to the identified scope, and optimizes the identified object using a property of the identified scope and associated aliasing information. Processor unit 104 tracks the identified object state to form tracked state information, stored in a storage area of storage devise 116 and uses the tracked state information to update the identified object.

In an alternative embodiment, program code 118 containing the computer-implemented process may be stored within computer readable media 120 as computer program product 122. In another illustrative embodiment, the process for managing aliasing constraints may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus executes the computer executable program code to direct the apparatus to perform the process for managing aliasing constraints.

This invention provides a novel method and system for scope-restricted aliasing by applying the rules of restricted pointers in the code region of the pointer's scope in terms of copyin and copyout semantics. The method is to delimit the scope of control on which the aliasing of a shadow can be restricted by creating an artifact that represents the state of the object during the section of control and gets synced up with the original object on entry/exit to the code region of the scope. This new method allows the compiler to apply more aggressive aliasing for a restricted pointer on a specific region of code with efficient compiler transformation and analyses that cannot be done with existing scope restrict aliasing representations.

Figure 2:
FIG. 2 is a block diagram of a compilation system, in accordance with various embodiments of the disclosure.

With reference to FIG. 2, a block diagram of a compilation system, in accordance with various embodiments of the disclosure is presented. Compilation system 200 is an example of an enhanced compilation system for managing aliasing constraints during a code optimization compilation. Compilation system 200 leverages an underlying data processing system such as data processing system 200 of FIG. 2 for typical support functions including communications, storage, and user interface mechanisms and processing capabilities. Compilation system 200 comprises a number of functional components, which may be implemented as separate software or hardware or a combination of hardware and software modules or as logical or physical grouping s of function or as a monolithic block of functions. Further compilation system 200 may be implemented as replacement compiler system or as an addition to an existing compiler system without affecting the operation of the disclosed process.

Compilation system 200 comprises components including enhanced compiler 202, scope setter 204, storage data structure 206 and artifact 208. Enhanced compiler 202 provides a capability to establish and manage portions of code associated with a specific operation or object by identifying a region and applying specific processing support while operating on code elements within the region or associated with the region. For example, applying rules of restricted pointers in the code region of the scope of the pointer, using copyin and copyout semantics.

Scope setter 204 provides a capability to logically or physically establish a region of code having an entrance indication and an exit indication demarking boundaries of a portion of code defining the region of control. For example, scope setter 204 establishes an entrance indication to a code region using a copyin semantic and an exit indication using a copyout semantic.

Storage data structure 206 provides a capability to create and maintain an artifact representing state information of an object, associated with a defined region, being processed. Storage data structure 206 provides a memory for persisting information used during the processing of code, such as copying an object, portion of an object or object information, and for synchronizing an object with artifact information or other associated processing information by enhanced compiler 202. For example, storage allocated by a corresponding copyin assignment uses storage data structure 206.

Artifact 208 provides a capability to represent a state of an object during a section of control, such as the defined scope of a portion of code. Having a capability to store state information representative of an object enables synchronization with an original object on entry to and exit from a code region of the scope previously set.

Figure 3:
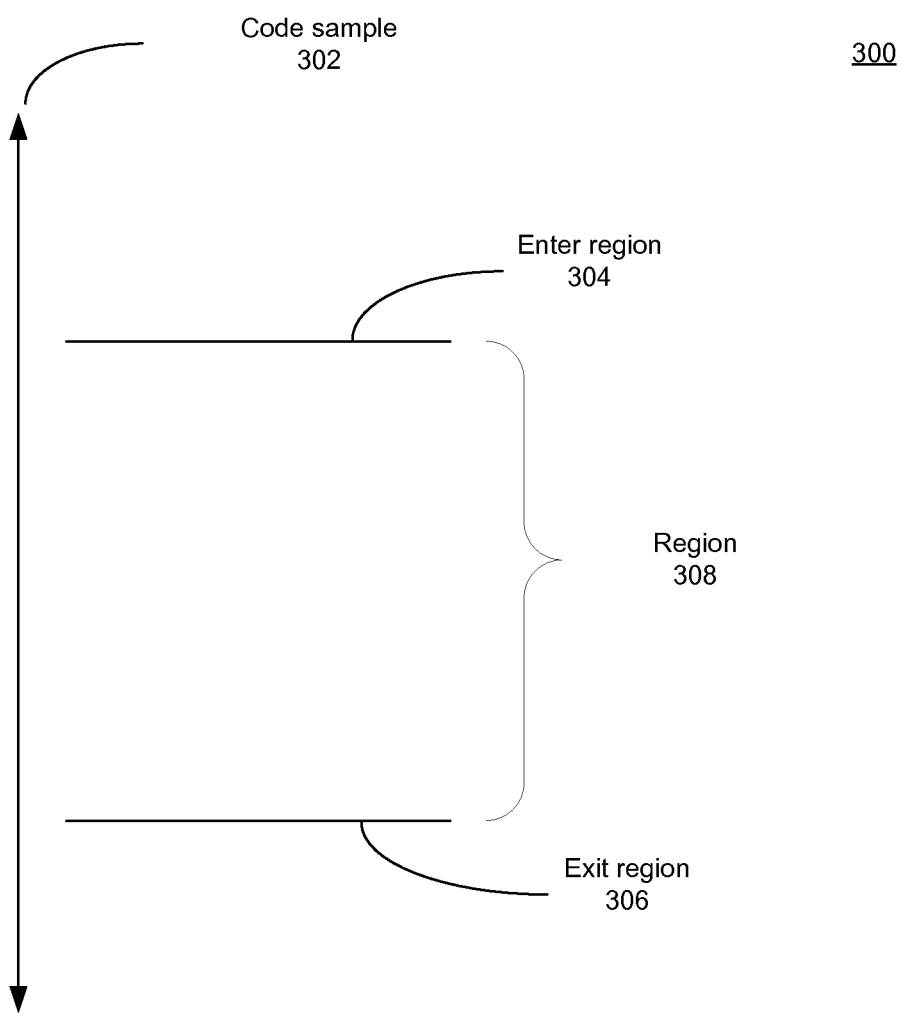
FIG. 3 is a logical view of a code region, in accordance with one embodiment of the disclosure.

With reference to FIG. 3, a logical view of a code region, in accordance with one embodiment of the disclosure is presented. View 300 is a representative view of a region in which a span of control for processing an object or objects is presented using a disclosed process of managing aliasing constraints of compilation system 200 of FIG. 2.

Code sample 302 is representative of a series of code, typically represented as pseudo code, although code statements can be used as well. Enter region 304 defines a starting point for a portion of code within a region. Enter region 304 is a transition point from normal code into a defined portion of code which is managed as a grouping or collection referred to as a region or control region, represented by region 308. Enter region 304 appears once to define the start of the region.

Exit region 306 is another transition point from the defined portion of code marked by enter region 304 to normal code after exit region 306. Both enter region 304 and exit region 306 may be represented either logically or physically. Further, exit region 306 may occur multiple times within a region and is not necessarily nested with a corresponding enter region 304. For example, when using copyout directives as an exit mechanism, a copyout directive will be placed at each exit point in the scope defined by region 308.

With reference to FIG. 4, a textual representation of code snippets, in accordance with one embodiment of the disclosure is presented. Code snippets are examples of using copyin and copyout actions in accordance with compilation system 200 of FIG. 2.

In the following examples, a compilation process using scope-restricted aliasing is provided. In the example, the compilation process delimits the scope of control on which aliasing of a shadow can be restricted by creating an artifact representing the state of the original object during the section of control (region) and is synchronized with the original object on entry/exit to the code region of the scope.

The compilation process applies rules of restricted pointers in the code region of within the scope of the pointer in terms of copyin and copyout semantics. The copyin and copyout actions are defined on the storage on scope entry and scope exit. On scope entry, when an address is assigned to a restricted pointer, the process creates a copy of the object, only accessible through a pointer returned, as indicated in statement 402. The copyin is on the part of the original object referenced through the restricted pointer. Semantically, the copyin can be expressed as shown in code snippet 400 to simulate the aliasing of the restricted pointer during compiler aliasing analysis and transformation, and will be expanded to a direct assignment of the address of the original object during code generation as in statement 406 of code snippet 404.

On scope exit, the restricted copyout receives a pointer generated by the entry restricted copyin. Semantically, it copies the content of the object that is being referenced through the restricted pointer in the scope back into the original object specified on the entry restricted copyin, as shown in statement 410 and deletes the copy as shown in statement 412 expressed as in code snippet 408 during the compiler aliasing analysis and transformation, and will be treated as a NOP during code generation, shown in code snippet 414 using statement 416.

Figure 5:
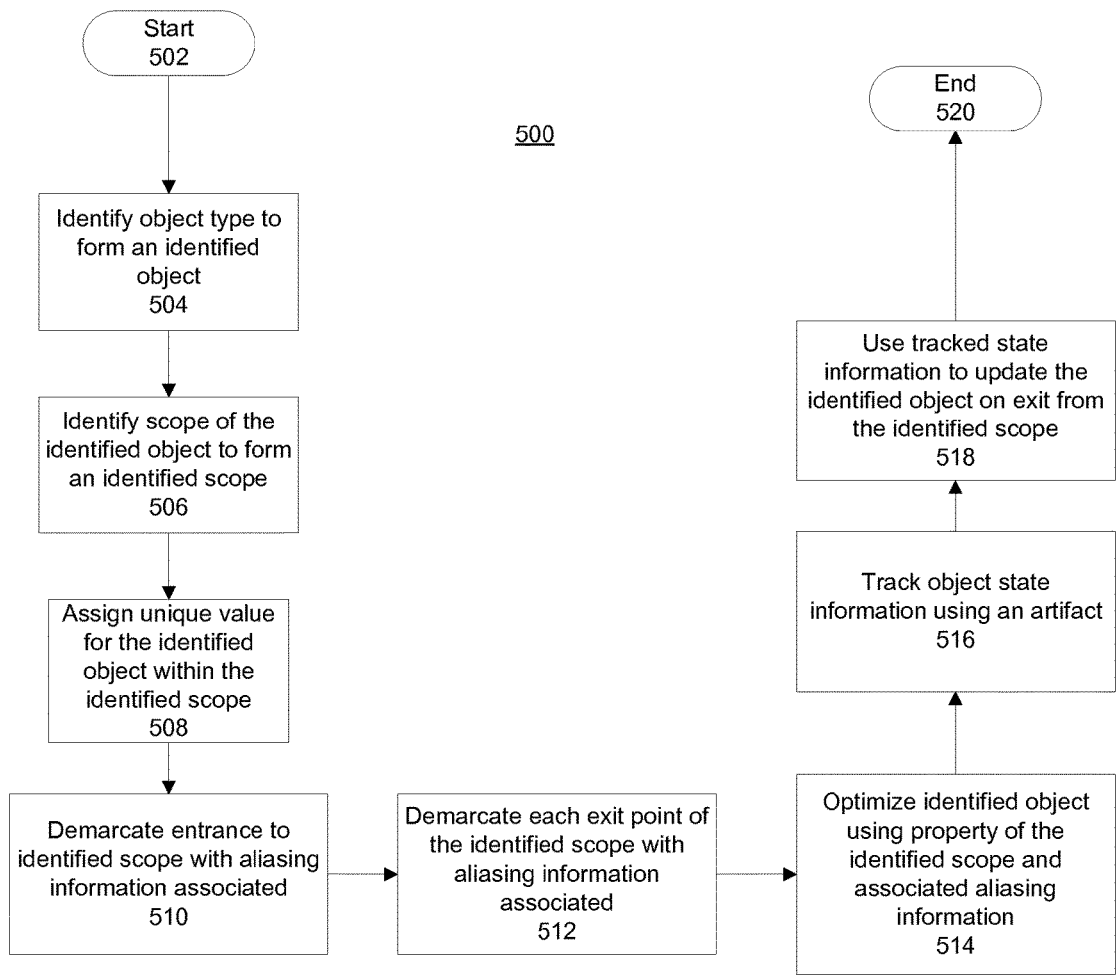
FIG. 5 is a flowchart of a process for managing aliasing constraints, in accordance with one embodiment of the disclosure.

With reference to FIG. 5, a flowchart of a process for managing aliasing constraints, in accordance with one embodiment of the disclosure is presented. Process 500 is an example of a general process for managing aliasing constraints using compilation system 200 of FIG. 2.

Process 500 begins (step 502) and identifies an object type to form an identified object (step 504). Identification determines whether the object is a candidate for managing aliasing constraints. For example when an object used as a target of a restricted pointer the restricted pointer becomes a candidate. Other candidates may also be used including pointers in array processing wherein strict aliasing is needed to avoid overreaching of a memory location.

Process 500 identifies a scope associated with the identified object to form an identified scope (step 506). The identified scope forms a region or portion of code for which associated properties may be used specific to the region. The region defines a management segment or control portion in which processing may be managed differently relative to code portions outside the region. Process 500 assigns a unique value for the identified object within the identified scope (step 508). The unique value identifies the object within the bounds of the scope.

Process 500 demarcates entrance to the identified scope with aliasing information associated (step 510). The entrance defines a start of a region in which different processing relative to a code portion outside the region may be used. To define an ending boundary of the region process 500 demarcates each exit point of the identified scope with aliasing information associated (step 512). For example, a region may have multiple exit points as determined by a number of exit points of the code within the region.

Process 500 optimizes the identified object using property of the identified scope and associated aliasing information (step 514). For example, having a defined region enables a more aggressive optimization because properties of the region are known replacing a less conservative optimization typically used when properties are unknown or not trusted. The aggressive optimization may not be aggressive per se but is aggressive relative to prior techniques which were required to be conservative in nature when processing within the scope.

Process 500 further tracks object state information using an artifact (step 516). The artifact is typically used to maintain state information of the target object for later synchronization with the original object. Process 500 uses the tracked state information to update the identified object on exit from the identified scope (step 518) and terminates thereafter (step 520).

Figure 6:
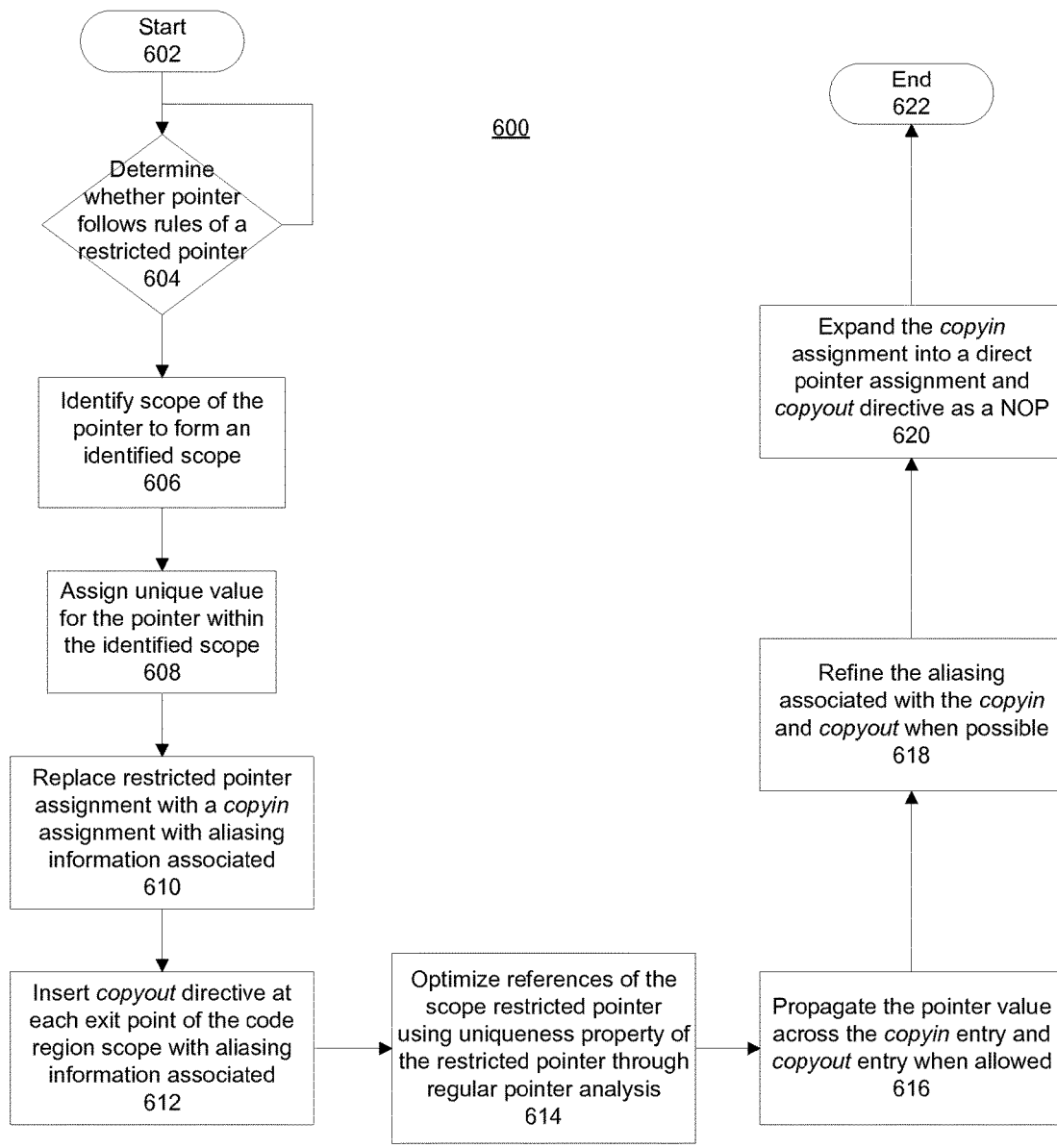
FIG. 6 is a flowchart of a process for managing aliasing constraints, in accordance with one embodiment of the disclosure.

With reference to FIG. 6, a flowchart of a process for managing aliasing constraints, in accordance with one embodiment of the disclosure is presented. Process 600 is an example of a process for managing aliasing constraints of restricted pointers using compilation system 200 of FIG. 2.

Compilation systems are typically composed of three functional areas, a front end which is specific to a programming language being composed (for example, C or FORTRAN) and processes the source files; an optimizer which performs alias analysis and optimizations; and a backend which generates executable code as output of the compilation systems. In this context and example process 600 outlines a method for scope restricted alias analysis using compilation system 200 of FIG. 2 with regard to restricted pointers.

Process 600 begins (step 602) and determines whether a pointer follows rules for a restricted pointer (step 604). When a determination that the pointer does not follow rules for a restricted pointer, process 600 loops back to perform step 604 again.

When a determination is made that the pointer follow rules for a restricted pointer, the front end portion of process 600 identifies for each restricted pointer declared in the program a scope to form an identified scope (step 606). Process 600 generates and assigns a unique value for the pointer within the identified scope (step 608). The value is unique for the restricted pointer and the scope of the code region.

For each pointer assignment to a restricted pointer, the front-end portion of process 600 replaces the restricted pointer assignment with a copyin assignment with associated aliasing information (step 610). At each exit point of the scope of the code region, the front end of process 600 inserts a copyout directive with associated aliasing information (step 612). The front end of process 600 provides aliasing information on both the copyin assignments and copyout directives on scope entry/exits to associate an alias class with the original object and the scope restricted object. For the purpose of dataflow analysis, copyin assignment on scope entry is considered a definition of the scope-restricted object, and copyout directive on scope exit a definition and use of the scope-restricted object. Both copyin assignments on scope entry and directives on scope exits are considered also as a potential definition and use of the original copied object. The definitions, use of aliasing associated with the copyin assignment and copyout directives may be refined later by the optimizer.

The front end also associates the unique value with the copyin assignments on scope entry and the copyout directives on scope exits for the restricted pointers. The copyin assignments and copyout directives must be associated with the same unique value for the same restricted pointer in the same scope of the code region. The value is used for optimizer to pair the corresponding copyin assignment and copyout directive to perform aliasing refinement. Process 600, using an optimization portion, optimizes references of the scope-restricted pointer using uniqueness property of the restricted pointer through regular pointer analysis (step 614). For example, using the regular pointer analysis to perform a more aggressive aliasing operation rather than conservative aliasing. Use of the regular pointer analysis in this case provides an optimization in comparison with the conservative aliasing technique previously available.

Process 600 propagates the pointer value across copyin entry and copyout exit when allowed (step 616). Copyin assignments and the copyout directives do not need to be lexically nested due to the complex of control flow of the code in the scope. A copyin assignment on scope entry can reach multiple copyout directives on scope exit based on control flow. Similarly, a copyout directive can be reached by multiple copyin assignments.

Process 600 refines the aliasing associated with the copyin and copyout when possible (step 618). For example, set and use flags to aid processing.

Process 600 expands the copyin assignment into a direct pointer assignment and copyout directive as a NOP (step 620) and terminates thereafter (step 622).

With reference to FIG. 7, a code snippet of a C language program comprising restricted pointers, in accordance with one embodiment of the disclosure is presented. Code snippet 700 is an example of using process 600 of FIG. 6.

Code snippet 700 represents a C block scope restricted pointer, in which a copyin assignment is used at the beginning of the scope to generate the value of the restricted pointer from the original object. A copyout directive on scope exit is used to represent the end of the lifetime of the restricted pointer. Any shadows used to dereference the restricted pointer will be aliased conservatively from the front-end portion of the enhanced compiler, as if the restricted keyword had not been specified. An example of the use of copyin assignment and copyout directive for a block scope restricted pointer is provided in FIG. 8.

The pointer variable p 702 is declared as a restricted pointer. The scope of pointer variable p 702 is denoted by an open brace of '{' as element 704 followed by a close brace of '}' of element 706. Scope is thus defined as the portion of the program to which a declaration applies. The front end of the enhanced compiler emits code as shown in FIG. 8 (in pseudo form of an intermediate representation).

With reference to FIG. 8, a code snippet of a C language program comprising restricted pointers, in accordance with one embodiment of the disclosure is presented. Code snippet 800 is a further example of using process 600 of FIG. 6 and code snippet 700 of FIG. 7.

Using the example of code snippet 800, for _restricted_copyin/copyout, first argument 802 has a unique value generated by a front-end portion of the enhanced compiler for the restricted pointer for the scope. Second argument 804 and third argument 806 represent the original pointer and the corresponding scope restricted pointer with associated def and use flags, respectively, to indicate the data pointed to will be altered or used or both. For code snippet 700 of FIG. 7, the copyin assignment is used for the restricted pointer assignment. Since there are exit points in the scope, the front-end portion of the enhanced compiler inserted two copyout directives at the corresponding places as in copyout directive 808 and copyout directive 810.

In another example a FORTRAN dummy argument, behaves as a restricted pointer. A restricted copy with both copyin and copyout is used for the argument at a function call site. On the callee side, the dummy parameter pointer is annotated with a flag to indicate restricted aliasing. Any shadows used to dereference the dummy argument will be aliased conservatively. When the enhanced compiler performs in-lining of the FORTRAN function into a respective call function, the parameters are scoped in the call function and a copyin assignment and a copyout directive are added.

Using the copyin/copyout semantics, the optimizer portion of the enhanced compiler can optimize references of the scope-restricted pointer through regular pointer analysis by applying the uniqueness property of the restricted pointer in the code region of the scope. The scope-restricted pointer is only used to access the storage allocated by the corresponding copyin assignment on scope entry and only the pointer can be used to access the storage. The scope restricted object will not alias any mapped storage during the execution of the scope. If both the original object and the corresponding scope restricted object are accessed before the copyout on scope exit, both objects must be read-only on that scope.

The optimizer portion of the enhanced compiler may also propagate the pointer values across a restricted copy entry/exit based on the fact that the copyin assignment on scope entry can be expanded as a direct copy of pointers and the copyout directive as a NOP. References to the object copy can be propagated past a corresponding copyin/copyout when they are replaced by a reference to the original object.

The optimizer portion of the enhanced compiler may also refine the aliasing associated with the copyin assignments and copyout directives, for example; only a use flag can be used to facilitate the code movement at a certain compilation stage when the restricted flag is only used in the code region of the scope.

Finally, a backend portion of the enhanced compiler expands the copyin assignment on scope entry into a direct assignment of the address of the original object and the copyout directive on scope exit to a NOP, once no further dataflow optimization is possible.

The disclosed copyin/copyout semantics may also be used for other purpose of the compiler analysis. For example, the address taken flag is not required to be set for a symbol when the address of the symbol is only loaded to feed directly to a restrict copy entry as a parameter to a function call with both the copyin and copyout.

Thus is presented in one illustrative embodiment a computer-implemented process for managing aliasing constraints, identifies an object to form an identified object, identifies a scope of the identified object to form an identified scope, and assigns a unique value to the identified object within the identified scope. The computer-implemented process further demarcates an entrance to the identified scope, demarcates an exit to the identified scope, optimizes the identified object using a property of the identified scope and associated aliasing information, tracks the identified object state to form tracked state information; and uses the tracked state information to update the identified object.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method of compiling a source file of a computer program using a compiler, comprising:
   identifying, within the source file, a restricted pointer to an original object to form an identified object, the restricted pointer having an identified scope with an entrance and one or more exits;
   generating, by the compiler, a unique value that identifies the identified object within bounds of the identified scope; and
   replacing, at the entrance, a pointer assignment of the restricted pointer with a copyin assignment including the unique value.

2. The method of claim 1, further comprising:
   inserting, at each of the one or more exits, a copyout directive including the unique value.

3. The method of claim 2, further comprising:
   pairing, by the compiler and based upon the unique value, the copyin assignment with the one or more copyout directives.

4. The method of claim 1, further comprising:
   optimizing, using regular pointer analysis, references of the restricted pointer using uniqueness properties of the restricted pointer in the identified scope.

5. The method of claim 1, further comprising:
   tracking state information of the identified object; and
   synchronizing the original object with the identified object using the tracked state information.

6. The method of claim 1, further comprising:
   using an aggressive aliasing on code with the identified scope in place of a conservative aliasing.

7. The method of claim 1, further comprising:
   expanding the copyin assignment into a direct pointer assignment; and
   expanding the copyout directive as a NOP.

8. A computer hardware system including a compiler configured to compile a source file of a computer program, comprising:
- a hardware processor configured to initiate the following executable instructions:
  - identifying, within the source file, a restricted pointer to an original object to form an identified object, the restricted pointer having an identified scope with an entrance and one or more exits;
  - generating, by the compiler, a unique value that identifies the identified object within bounds of the identified scope; and
  - replacing, at the entrance, a pointer assignment of the restricted pointer with a copyin assignment including the unique value.

9. The system of claim 8, wherein the hardware processor is further configured to initiate the following executable instruction:
- inserting, at each of the one or more exits, a copyout directive including the unique value.

10. The system of claim 9, wherein the hardware processor is further configured to initiate the following executable instruction:
- pairing, by the compiler and based upon the unique value, the copyin assignment with the one or more copyout directives.

11. The system of claim 8, wherein the hardware processor is further configured to initiate the following executable instruction:
- optimizing, using regular pointer analysis, references of the restricted pointer using uniqueness properties of the restricted pointer in the identified scope.

12. The system of claim 8, wherein the hardware processor is further configured to initiate the following executable instructions:
- tracking state information of the identified object; and
- synchronizing the original object with the identified object using the tracked state information.

13. The system of claim 8, wherein the hardware processor is further configured to initiate the following executable instruction:
- using an aggressive aliasing on code with the identified scope in place of a conservative aliasing.

14. The system of claim 8, wherein the hardware processor is further configured to initiate the following executable instructions:
- expanding the copyin assignment into a direct pointer assignment; and
- expanding the copyout directive as a NOP.

15. A computer program product, comprising:
- a computer hardware storage device having computer executable program code stored therein for compiling a source file of a computer program,
- the computer executable program code, which when executed by a computer hardware system including a compiler, causes the computer hardware system to perform:
  - identifying, within the source file, a restricted pointer to an original object to form an identified object, the restricted pointer having an identified scope with an entrance and one or more exits;
  - generating, by the compiler, a unique value that identifies the identified object within bounds of the identified scope; and
  - replacing, at the entrance, a pointer assignment of the restricted pointer with a copyin assignment including the unique value.

16. The computer program product of claim 15, wherein the computer executable program code further causes the computer hardware system to perform:
- inserting, at each of the one or more exits, a copyout directive including the unique value.

17. The computer program product of claim 16, wherein the computer executable program code further causes the computer hardware system to perform:
- pairing, by the compiler and based upon the unique value, the copyin assignment with the one or more copyout directives.

18. The computer program product of claim 15, wherein the computer executable program code further causes the computer hardware system to perform:
- optimizing, using regular pointer analysis, references of the restricted pointer using uniqueness properties of the restricted pointer in the identified scope.

19. The computer program product of claim 15, wherein the computer executable program code further causes the computer hardware system to perform:
- tracking state information of the identified object; and
- synchronizing the original object with the identified object using the tracked state information.

20. The computer program product of claim 15, wherein the computer executable program code further causes the computer hardware system to perform:
- using an aggressive aliasing on code with the identified scope in place of a conservative aliasing.

* * * * *